United States Patent [19]

Fisher

[11] Patent Number: 4,537,269
[45] Date of Patent: Aug. 27, 1985

[54] VEHICLE WITH PNEUMATIC ASSEMBLY FOR DRIVING, BRAKING, AND REDUCING FRICTION ON BEARINGS

[76] Inventor: William M. Fisher, 2017 Plainfield, Des Plaines, Ill. 60018

[21] Appl. No.: 429,789

[22] Filed: Sep. 30, 1982

Related U.S. Application Data

[62] Division of Ser. No. 166,472, Jul. 7, 1980, Pat. No. 4,360,222.

[51] Int. Cl.³ .............................................. B60K 3/00
[52] U.S. Cl. ....................................... 180/10; 74/661; 180/297; 180/302; 192/76; 192/83
[58] Field of Search ............ 180/10, 297, 301, 302; 192/71, 76, 83, 86; 74/661, 352

[56] References Cited

U.S. PATENT DOCUMENTS

| | | | |
|---|---|---|---|
| 1,313,081 | 8/1919 | Finney | 180/302 X |
| 3,039,552 | 6/1962 | Lange | 180/302 |
| 3,265,147 | 8/1966 | Coordes | 180/10 X |
| 3,513,929 | 5/1970 | Kim | 180/302 |
| 4,162,614 | 7/1979 | Holleyman | 180/302 |
| 4,383,589 | 5/1983 | Fox | 180/302 X |

Primary Examiner—Joseph F. Peters, Jr.
Assistant Examiner—Michael Mar

[57] ABSTRACT

In a moving vehicle such as an automobile, compressed air is used for powering the vehicle, for minimizing friction in the wheel bearings so as to maintain the vehicle's momentum and decrease the amount of energy required for maintaining the vehicle at a predetermined desired speed, and for braking the vehicle. The present invention can be used instead of a conventional internal combustion engine, or as an auxiliary means for decreasing the amount of energy that is consumed by an internal combustion engine to increase the speed of a vehicle and maintain a vehicle at a predetermined speed.

12 Claims, 4 Drawing Figures

VEHICLE WITH PNEUMATIC ASSEMBLY FOR DRIVING, BRAKING, AND REDUCING FRICTION ON BEARINGS This is a division of application Ser. No. 166,472, filed July 7, 1980, now U.S. Pat. No. 4,360,222.

FIELD OF THE INVENTION

The present invention relates to vehicles and, more particularly, to a vehicle having a pneumatic assembly for powering the vehicle, for braking the vehicle, and for reducing the effective weight supported by the roller bearings associated with each of the wheels of a vehicle.

BACKGROUND OF THE INVENTION

Conventional vehicles such as automobiles are powered by means of internal combustion engines. A fuel, such as gasoline, is combusted in order to provide power to the drive train of the vehicle for the purpose of moving the vehicle.

Disadvantages of powering vehicles by means of engines that consume fuel include problems with the expense and availability of the fuel, the noxious by-products of the burnt fuel which cause pollution, and the relatively complicated and expensive engines that are required to burn the fuel, with many moving parts that become worn and require expensive repairs or tuning up.

Conventional vehicles also have roller bearings associated with each of the wheels of the vehicle. The bearings each have an inner race to which the axle is secured, with the inner race having an outer surface that is machined into a smooth track. The inner race stays stationary with the vehicle frame. The bearing includes an outer race that fits closely into a casing or hub. The outer race rotates with the wheel, and has an inner surface that is machined into a smooth track. A plurality of cylindrical rollers are positioned between the inner and outer races so that the outer race can be rotated relative to the stationary inner race.

Essentially all of the vehicle's weight is supported by the roller bearings. As the vehicle moves and the wheels rotate, while the axle and inner races remain stationary, the weight of the vehicle bears down on the inner races. The purpose of the wheel bearings is to minimize the amount of friction between the races and the cylindrical rollers as the vehicle is moving, since any friction will tend to reduce the speed of the vehicle and require more power to maintain the vehicle at a desired speed. The wheel bearings, therefore, are of limited success. While they reduce friction, there is nevertheless considerable friction between the races and the cylindrical rollers resulting from the weight of the vehicle.

Conventional vehicles also include brakes for reducing the speed of a vehicle. Typical conventional braking assemblies are of the disc brake type. A problem with coventional braking assemblies is the fact that they wear out and require repair or replacement.

SUMMARY OF THE INVENTION

The foregoing disadvantages of the prior art are overcome in accordance with the present invention in which compressed air is used for the purpose of powering a vehicle such as an automobile, for braking the vehicle, and for reducing the effective weight of the vehicle supported by the vehicle's wheel bearings.

In accordance with the present invention, a pneumatic drive assembly is provided in which a drive wheel is adapted to engage a track. The pneumatic drive assembly includes a frame and a drive wheel mounted to a drive shaft. The drive shaft is supported by the frame and is movable relative to the frame.

An enclosed chamber is supported by the frame. The chamber defines first and second openings. A conduit communicates with the first opening in the chamber for providing air to the chamber. Air regulating means is provided for regulating the entry of air into the chamber, whereby an operator can have air admitted into the chamber or substantially prevent air from entering the chamber.

A second conduit has one end in communication with the second opening in the chamber. A pneumatic cylinder is in communication with the other end of the second conduit. The pneumatic cylinder is supported by the frame and movable between an unextended position and an extended position. The pneumatic cylinder is operably connected to the drive shaft.

When air is admitted into the chamber, the air exits the chamber into the second conduit, moves the pneumatic cylinder from the unextended position to the extended position, and thereby moves the drive shaft and drive wheel from a first position in which the drive wheel is spaced apart from the track to a second position in which the drive wheel engages the track.

Preferably, the chamber also defines a third opening. A third conduit has one end in communication with the third opening in the chamber.

A first air motor is supported by the frame and in communication with the other end of the third conduit. The first air motor includes first rotatable means operably connected to the drive shaft. Second air regulating means is provided for regulating the entry of air into the third conduit. When air is admitted into the third conduit, the air actuates the first air motor which thereby turns the first rotatable means and the drive shaft and rotates the drive wheel.

Preferably, the chamber also defines a fourth opening. A fourth conduit has one end in communication with the fourth opening in the chamber.

A second air motor is supported by said frame and in communication with the other end of the fourth conduit. The second air motor includes second rotatable means operably connected to the drive shaft. Third air regulating means is provided for regulating the entry of air into the fourth conduit. When air is admitted into the third conduit, the air actuates the first air motor which thereby turns the first rotatable means and the drive shaft and rotates the drive wheel in a first direction. When air is admitted into the fourth conduit, the air actuates the second air motor which thereby turns the second rotatable means and the drive shaft and rotates the drive wheel in an opposite second direction.

The means for regulating the entry of air into the chamber preferably comprises first piston means that is supported by the frame and is retractable and extendable between a first position in which the piston substantially covers the first opening to substantially prevent the entry of air into the chamber, and a second position in which the piston is spaced apart from the first opening so that air can be admitted into the chamber, and further including means for actuating the piston.

The means for regulating the entry of air into the third conduit preferably comprises second piston means that is supported by the frame and is retractable and extendable between a first position in which the second piston substantially covers the third opening to substantially prevent the entry of air into the third conduit, and a second position in which the second piston is spaced apart from the third opening so that air can be admitted into the third conduit, and further including means for actuating the second piston.

The pneumatic cylinder preferably comprises at least one cylinder having a piston rod extending at least partially out of the cylinder. The piston rod has a piston head at one end thereof, positioned within the cylinder. Resilient means, such as a spring, is positioned within the cylinder between the piston head and one end of the cylinder to resist movement of the piston rod from one of the unextended and extended positions to the other of the positions. The spring also returns the piston rod to the one position when air is not admitted into the chamber.

The means for operably connecting the pneumatic cylinder to the drive shaft preferably comprises a pair of spaced apart bearing blocks operably connected to the pneumatic cylinder. Each of the blocks is spaced apart from the drive wheel. The drive wheel has an axis through which the drive shaft extends. The bearing blocks are positioned on opposite sides of the drive wheel, with the drive shaft being received through each of the bearing blocks.

In accordance with the present invention, apparatus is provided for reducing the effective weight supported by the cylindrical roller bearings associated with each of the wheels of a vehicle having a frame, thereby to reduce the friction in the bearings when the vehicle is moving.

Each of the bearings has an inner race, an outer race, and a plurality of rollers positioned between the inner race and the outer race. An axle is received in and secured to the inner race of the bearings. The inner race of the bearings is operably connected to the vehicle frame. The outer race is operably connected to the rotating wheels.

Each of the vehicle wheels is rotatable and is operably connected to the axle. Each wheel defines a generally cylindrical inside surface, and a generally cylindrical outer surface adapted to engage a supporting surface.

An air chamber is supported by the vehicle frame and is operably connected to the inner race of the bearings and has a bottom surface juxtaposed to a portion of the inside surface of the wheel. The bottom surface defines a plurality of apertures and is positioned generally below the bearings.

Means is provided for supplying air to the air chamber when the vehicle is moving. Air supplied to the air chamber exits through the apertures and is directed against the inside surface of the wheel, thereby forming an air pocket between the inside surface of the wheel and the bottom surface of the air chamber. This provides a lift effect on the air chamber and correspondingly on the vehicle frame and the inner race of the bearings, thereby reducing the effective vehicle weight that is supported by the bearings to reduce the friction in the bearings when the vehicle is moving.

The air chamber is rigidly secured to the vehicle frame and preferably defines a plurality of chambers. Each of the chambers has a bottom surface defining a plurality of apertures. The chambers are spaced radially from one another in relation to the inside surface of the wheel.

A pendulum is provided for maintaining the air chamber in vertical relation to a flat supporting surface even when the vehicle is on an incline. The pendulum preferably is journalled about one of the axle and the bearing, and has a downwardly extending depending portion having a predetermined weight. The pendulum includes means for selecting one of the chambers for the air to be supplied to, whereby regardless of whether the vehicle is inclined relative to a flat supporting surface, the pendulum extends vertically and selects one of the chambers that is in vertical relation to a flat supporting surface.

The means for supplying air to the chamber preferably comprises a rotatable ring supported by the vehicle frame, and means is provided for rotating the ring. At least one enclosed compartment is secured to the ring, the compartment being adapted to receive air and being movable between an inflated expanded condition and a substantially deflated compressed condition. The compartment is biased to the inflated condition. Means is provided for moving the compartment from the inflated condition to the substantially deflated condition.

A valve is provided for permitting air to enter the compartment when the compartment moves from the substantially deflated condition to the inflated condition, and for permitting air to exit the compartment when the compartment moves from the inflated condition to the substantially deflated condition.

The valve preferably comprises a first one-way valve that permits air from the atmosphere to enter the compartment and substantially prevents air in the compartment from exiting from the compartment. It further includes a second one-way valve that is connected to the conduit and permits air to exit from the compartment and enter the conduit and substantially prevents air in the conduit from entering the compartment.

A conduit communicates at one end with the valve so that air that exits from the compartment is received in the conduit, and the conduit has an opposite end that communicates with the chamber.

The means for moving the compartment from the inflated expanded condition to the substantially deflated compressed condition preferably comprises a camming plate supported by the vehicle frame, the compartment being positioned adjacent to the ring whereby the compartment engages the camming plate and is compressed.

The compartment preferably comprises a bellows that is biased to an inflated condition and is movable to a substantially compressed deflated condition, and a plurality of substantially identical bellows are secured to the ring.

In accordance with the present invention, apparatus is provided for braking a moving vehicle that has a plurality of rotatable wheels. At least one enclosed compartment is secured to the wheel for rotation with the wheel. The compartment is adapted to receive air and is movable between an inflated expanded condition and a substantially deflated compressed condition. The compartment is biased to the inflated condition.

Means is provided for moving the compartment from the inflated condition to the substantially deflated condition, preferably comprising a depressor plate that is supported by the vehicle and is positioned adjacent to the wheel whereby the compartment engages the depressor plate and is compressed thereby.

A valve is provided for permitting air to enter the compartment when moving from the substantially deflated condition to the inflated condition, and for permitting air to exit the compartment when moving from the inflated condition to the substantially deflated condition.

A conduit communicates at one end with the compartment valve so that air that exits from the compartment is received in the conduit. A braking valve is secured to the opposite end of the conduit. The braking valve has an open condition in which air exits from the conduit through the braking valve, and a closed condition in which air is retained in the conduit. Means is provided for opening and closing the braking valve.

The wheels of the moving vehicle rotate so that the inflated compartment engages the depressor plate and is compressed, thereby releasing air into the conduit. The vehicle is slowed by closing the braking valve, whereby air collects in the conduit and creates back pressure, thereby causing the compartment to resist compression by the depressor plate. The resistance of the compartment against the depressor plate results in the braking of the vehicle.

In accordance with the various features of the present invention, compressed air is used for powering a moving vehicle such as an automobile, for minimizing friction in the wheel bearings so as to maintain the vehicle's momentum and decrease the amount of energy required for maintaining the vehicle at a predetermined desired speed, and for braking the vehicle. The present invention can be used instead of conventional internal combustion engine, or as an auxiliary means for decreasing the amount of energy that is consumed by an internal combustion engine to increase the speed of a vehicle and maintain a vehicle at a predetermined speed.

DESCRIPTION OF THE PREFERRED EMBODIMENT

Figure 1:
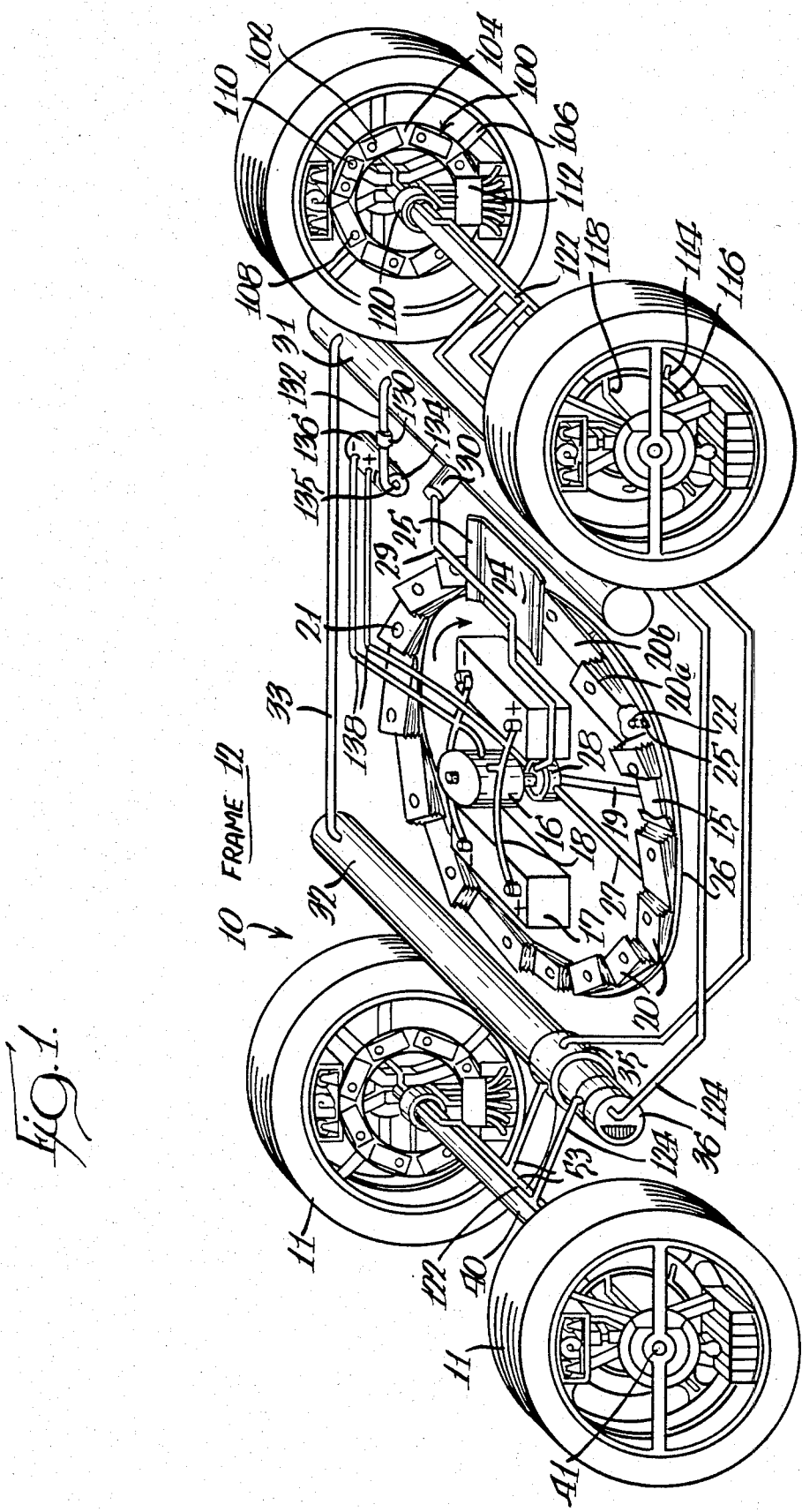
FIG. 1 is an isometric view of a vehicle incorporating my new invention, the frame of the vehicle being cut away to show interior detail.

While this invention is susceptible of embodiment in many different forms, there is shown in the drawings and described herein in detail one specific embodiment of the invention, with the understanding that the present disclosure is to be considered as an exemplification of the principles of the invention and is not intended to limit the invention to the embodiment illustrated.

The present invention relates to moving vehicles, such as automobiles. More specifically, the present invention relates to a pneumatic drive assembly, an apparatus for reducing the effective weight supported by the cylindrical roller bearings associated with each of the vehicle wheels, and an apparatus for braking a moving vehicle.

All of the foregoing are adapted to utilize air for their operation. Accordingly, the present invention discloses a preferred embodiment for supplying the compressed air that is used for the pneumatic drive assembly, the apparatus for reducing the effective weight of the vehicle that is supported by the roller bearings associated with the vehicle wheels, and the apparatus for braking the moving vehicle.

The vehicle, which is designated generally as 10 in FIG. 1, includes a plurality of rotatable wheels 11 and a main frame 12, with the frame being cut away to show interior detail.

APPARATUS FOR SUPPLYING COMPRESSED AIR

In accordance with the present invention, an apparatus 14 is provided for supplying compressed air. The apparatus includes a rotatable wheel or ring 15 that is supported by the vehicle frame 12. The ring 15 is driven by a motor 16 that is mounted on the vehicle frame 12. The motor 16 is powered by conventional means, such as a battery 17 which sends electricity through cables 18 to the motor. A battery recharging unit (not shown) may be provided to convert house current for recharging the batteries 17 when the vehicle is not being used. Alternatively, photo-electric cells (not shown) may be provided for recharging the batteries 17 by means of solar energy.

Braces or rods 19 (only one being shown in FIG. 1) have one end secured to the ring 15 and an opposite end secured to the rotatable portion of the motor 16. Thus, the operator of the vehicle may activate a switch (not shown) to actuate the motor 16. As the motor turns, it rotates the ring 15 by means of the braces 19 that interconnect the motor 16 and the ring 15.

Secured to the ring 15 are a plurality of enclosed compartments which are preferably in the form of bellows 20. Each of the individual bellows 20 is adapted to receive air and is movable between an inflated, expanded condition (see bellows 20a) and a substantially deflated, compressed condition (see bellows 20b). Each of the bellows is inherently biased to the expanded, inflated condition.

As shown in FIG. 1, the bellows are sequentially spaced about the ring 15, and all of the bellows 20 preferably are of substantially identical construction.

Each bellows 20 includes valve means for permitting air to enter the bellows when moved from the substantially deflated condition to the inflated condition, and for permitting air to exit the bellows when moving from the inflated condition to the substantially deflated condition. Referring to bellows 20a, the valve means preferably comprises a first one-way valve 21 on the top wall of the bellows that permits air from the atmosphere to enter the bellows 20a and substantially prevents air in the bellows from exiting therefrom. The valve means further include a second one-way valve 22 shown on the bottom wall of the bellows 20a that permits air to exit from the bellows 20a and substantially prevents air that is outside the bellows 20a from entering the bellows.

A depressor plate 24 is provided for mechanically moving the bellows 20 from the inflated, expanded condition to the substantially deflated, compressed condition. The depressor plate 24 is supported by and secured to the frame of the vehicle. The depressor plate is positioned directly above the ring 15 and is spaced apart from the ring by a distance about equal to the thickness of the bellows 20 in the compressed condition.

As the bellows rotate on the ring 15 in a clockwise direction, each of the bellows contacts the upwardly curved front end 25 of the depressor plate. The upper wall of the bellows is depressed by means of the camming action resulting from the contact with the depressor plate. The bellows is thereby moved from the inflated, expanded condition shown by bellows 20a to the deflated, compressed condition illustrated by bellows 20b that has not yet been released by the depressor plate 24. As the bellows continues to rotate clockwise, it is released by the depressor plate, whereupon the bellows expands in accordance with its natural bias to assume the inflated condition. As the bellows inflates, air from the atmosphere enters the bellows through valve 21.

A plurality of air lines or conduits are used to convey the air from the bellows 20. Referring to FIG. 1, as the upper wall of each bellows is pushed downward by the depressor plate, the bellows is compressed and air is forced out of the bellows through the one-way valve 22 and goes into bellows conduit 25 that has one end secured to the valve 22 and an opposite end that is secured to ring conduit 26. The bellows conduit 25 is in communication with the ring conduit 26. Each of the bellows 20 has a short bellows conduit 25 that extends to the ring conduit 26, with the conduit 26 circumscribing the entire ring 15. Thus, as each of the bellows is compressed, the air is directed into the conduit 26.

Ring conduit 26 communicates with commutator conduit 27 which is an air line that extends from the conduit 26 to commutator 28. Conduits 25, 26 and 27 all rotate with ring 15. The purpose of the commutator 28 is to take the air that is collected from the depressed bellows and convey the air from the rotating conduits to stationary conduits that are supported by the vehicle frame 12. Although the outer portion of the commutator rotates, it includes an inner portion that is stationary and forms a substantially airtight seal with the outer portion to prevent the escape of air.

The air from the inner portion of the commutator 28 is conveyed to the air conduit 29, through a one-way valve 30, and into a storage tank 31. The one-way valve 30 permits air to enter the storage tank 31 from the conduit 29, but substantially prevents air from escaping from the storage tank 31 to the conduit 29. There is preferably a second storage tank 32 that is connected to the first storage tank 31 by means of an air conduit 33.

The storage tanks 31 and 32 are filled with air until a predetermined desired air pressure is obtained. The storage tank 32 includes a release valve 35 that is operably connected to an exhaust valve 36. Once the storage tanks have reached the desired air pressure, any additional air is vented from the storage tanks by actuation of a control valve 130, which results in the exhaustion of air from the storage tanks as described hereinbelow.

Apparatus for Producing Lift Effect

One of the uses of the air stored in tanks 31 and 32 is to reduce the effective weight of the vehicle that is supported by the cylindrical roller bearings that are associated with each of the wheels of the vehicle. Referring to the rear pair of wheels 11 in FIG. 1, there is an axle 40 extending between the wheels, and a wheel bearing 41 associated with each wheel.

Figure 4:
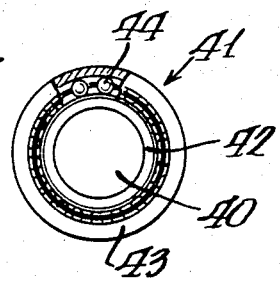
FIG. 4 is a front elevational view of a wheel bearing used in the vehicle shown in FIG. 1, with the wheel bearing partially cut away to show interior detail.

The wheel bearing 41 is shown in greater detail in FIG. 4. The wheel bearing 41 is of the roller type and, in the embodiment shown, is a cylindrical roller bearing. The bearing 41 has a stationary inner race 42 to which the axle 40 is secured. The inner race 42 has a smooth outer surface. The bearing 41 also includes a rotatable outer race 43 that is operably connected to the rotating wheel 11 and has an inner surface that is machined into a smooth track. The inner and outer races preferably are formed of hard steel. Between the inner race 42 and the outer race 43 are a plurality of cylindrical rollers 44 of hard steel.

The outer race 43 turns with the wheel 11, and the inner race 42 stays stationary with the axle and the vehicle frame. The vehicle frame 12 is operably connected to the inner race 42. The cylindrical rollers 44 maintain the races 42 and 43 at a predetermined distance from each other and rotate so that friction is changed from the sliding type to the rolling type.

Although the bearings 41 substantially reduce friction, there is, nevertheless, a considerable amount of friction in the bearings. A cause of the friction is the weight of the vehicle being supported by the bearings 41.

In accordance with the present invention, means is provided for reducing the effective weight of the vehicle that is supported by the bearings 41, thereby to reduce the friction in the bearings when the vehicle is moving. This will enable a vehicle to travel further with its momentum, and reduce the amount of force required to maintain a vehicle at a predetermined desired speed.

Figure 2:
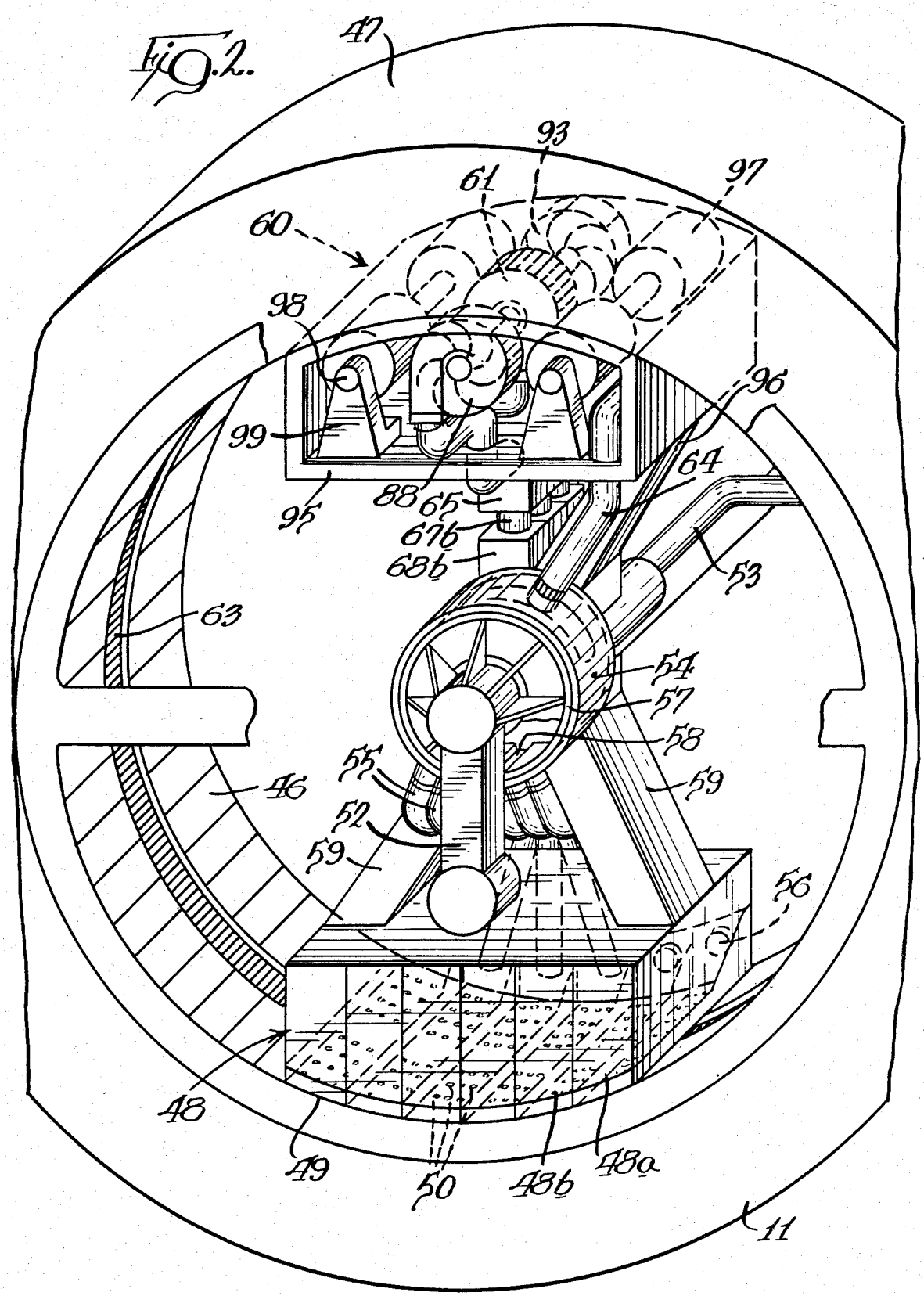
FIG. 2 is a fragmentary, enlarged, isometric view of one of the wheels of the vehicle shown in FIG. 1, with the frame of the wheel being cut away to show interior detail.

Referring to FIG. 2, each of the wheels 11 defines a generally cylindrical inside surface 46 that defines a track. The wheel also defines a generally cylindrical outer surface 47 that is adapted to engage a supporting surface such as a roadway.

An air chamber 48 is operably connected to the inner race 42 of the bearing 41 and has a bottom surface 49 that is juxtaposed to a portion of the inside surface 46 of the wheel. The bottom surface 49 of the air chamber preferably has the shape of a segment of the outside surface of a cylinder, so that it will mate with the inside surface 46 of the wheel. The bottom surface 49 of the air chamber is provided with a plurality of through apertures 50 which preferably are perpendicular to the bottom surface 49. The air chamber 48 is positioned generally below the wheel bearing 41 and, preferably, the entire air chamber 48 is below the wheel bearing.

Air from the storage tank 32 is supplied to air chamber 48 via conduits. The air can escape from the chamber 48 only through the apertures 50. As the air continues to enter the chamber 48 through the conduits, it exits through the apertures. The air is directed against the inside surface 46 of the wheel, and creates a relatively thin air pocket between the bottom surface 49 of the air chamber and the inside surface 46 of the wheel. The air travels laterally until reaching the outer edges of the bottom surface 49 of the air chamber, whereupon the air escapes to the atmosphere.

The creation of the air pocket causes a minute gap to form between the bottom surface of the air chamber 48 and the inside surface 46 of the wheel. This gap causes a concomitant lifting of the air chamber 48 and the inner race 42 of the wheel bearing 41 to which the air chamber is operably connected. The lifting effect on the inner race counters a portion of the vehicle weight that bears down on the wheel bearing, thereby to reduce the friction in the wheel bearing when the vehicle is moving.

The distance that the outer race is lifted as a result of the formation of the air pocket is so slight that it is merely absorbed by the aforementioned components of the vehicle, namely the chamber 48, races 42 and 43, and rollers 44.

In the preferred embodiment, the air chamber 48 comprises a plurality of separate air chambers such as 48a and 48b. The air chambers are rigidly secured to the vehicle frame 12. Since the vehicle can go uphill and downhill as well as on level roads, the portion of a bottom surface 49 through which the air should exit to maximize the negation of the gravitational force on the vehicle may vary. To achieve this purpose, a pendulum 52 is provided for maintaining the air chamber in vertical relation to a flat supporting surface regardless of whether the vehicle is inclined relative to a flat supporting surface, thereby to maximize the lift effect and maximize the reduction of friction in the bearings.

Each of the individual air chambers 48a and 48b is spaced radially from one another in relation to the inside surface 46 of the wheels, and includes a segment of the bottom surface 49 with a plurality of apertures 50.

When the vehicle is moving, air from the storage tank 32 enters conduit 53 (FIGS. 1 and 2) and the compressed air goes to the pendulum air distributor valve 54. The distributor valve 54 has a plurality of openings spaced sequentially around a portion of the circumference of the valve, with one of the openings corresponding to each of the individual air chambers 48a, 48b. A plurality of conduits 55 each have one end secured to one of the openings in the distributor valve and an opposite end secured to an opening 56 in one of the chambers 48a, 48b. The conduit 55 communicates with both the distributor valve 54 and the air chambers 48.

The pendulum 52 is journalled about either the axle 40 or the bearing 41 so that it hangs freely therefrom, and has a downwardly extending depending portion that has a predetermined weight. Since the pendulum 52 is journalled for rotation, the force of gravity will always maintain the depending portion of the pendulum in vertical relation to a flat surface.

The pendulum also includes a cylindrical outer wall 57 that defines an opening 58. As the pendulum rotates, the cylindrical wall rotates with it. The opening 58 is aligned with the depending portion of the pendulum 52 such that the opening is directed downwardly. The opening 58 is always aligned with one or two of the openings in the distributor valve 54, so that compressed air may exit the distributor valve and travel through the conduit 55 to one or two of the air chambers 48.

Depending upon the angular orientation of the vehicle on a road surface, the pendulum 52 thereby selects the individual chambers to which the compressed air will be directed to obtain the maximum vertical force from the air exiting the chamber 48, whether the vehicle is going uphill, downhill, accelerating or stopping.

In the illustrated embodiment, support columns 59 are secured at one end to the chamber 48 and at the opposite end to the outside surface of the distributor valve 54 so that the chamber is supported by the vehicle frame 12.

The bottom surface 49 of the air chamber 48 and the inner surface 46 of the wheels preferably are coated with Teflon to minimize any frictional resistance encountered in turning the wheel 11 beneath the air chamber 48, despite the weight of the vehicle.

Pneumatic Drive Assembly

Figure 3:
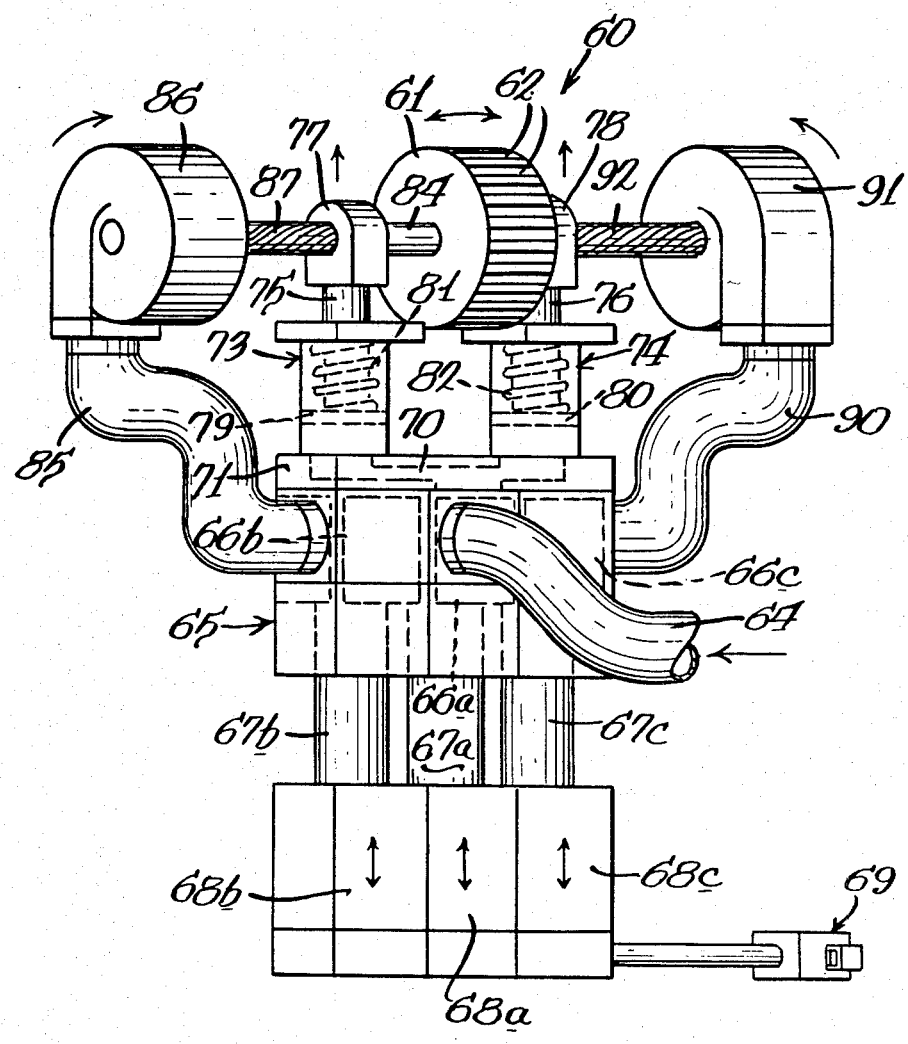
FIG. 3 is an enlarged isometric view of the pneumatic drive assembly for the vehicle shown in FIG. 1.

Referring to FIGS. 2 and 3, a pneumatic drive assembly 60 is provided in accordance with the present invention in which a drive wheel 61 having an outer surface with tread 62 is adapted to engage and grip the recessed central drive portion 63 of the inside surface 46 of the wheel 11. The recessed portion 63, together with the smooth inside surface of the wheel on opposite sides of the central drive portion, together define a track.

An air conduit 64 extends from the top of the distributor valve 54 (FIG. 2) to a valve piston chamber 65. The chamber 65 encases the heads 66a, 66b, 66c of piston rods 67a, 67b, 67c, respectively, which are connected to solenoids 68a, 68b, 68c, respectively.

As the operator of the vehicle depresses the accelerator pedal (not shown) for the purpose of increasing the speed of the vehicle, an electrical signal is sent through the solenoid control wires-in-harness 69 to the drive wheel power solenoid 68a, shown as the middle solenoid in FIG. 3.

The enclosed valve piston chamber 65 has a first opening that communicates with the air conduit 64. When the valve piston head 66a is in the raised position, it covers this opening and substantially prevents air in the conduit 64 from entering the chamber 65. When the electrical signal is sent to the solenoid 68a, the valve piston head 66a is retracted to a lowered, unextended position, thereby exposing the first opening and permitting air from the conduit 64 to be admitted into the chamber 65. Once air enters the chamber 65, it can exit the chamber through a second opening in the top wall of the chamber, and travels through passageways 70 in the base 71 of the pneumatic cylinder assembly.

The pneumatic piston cylinder assembly includes a pair of pneumatic piston cylinders 73 and 74 that are positioned on opposite sides of the drive wheel 61. The pneumatic piston cylinders 73 and 74 each include a piston rod 75 and 76, respectively, having a stem portion that extends outwardly of the piston cylinder. Bearing blocks 77 and 78 are secured to the upper ends of the stem portion of the piston rods 75 and 76, respectively. The bearing blocks 77 and 78 are positioned on opposite sides of the drive wheel 61.

At the bottom end of the piston rods 75 and 76 are the piston heads 79 and 80, respectively, which form a substantially air-tight seal with the wall of the pneumatic piston cylinders. Resilient means, such as compression springs 81 and 82, are positioned about the piston rods 75 and 76 between the piston heads 79 and 80 and the upper end of the pneumatic piston cylinders 73 and 74. The compression springs 81 and 82 maintain the piston rods 75 and 76 in the pneumatic piston cylinders 73 and 74 biased to a retracted, unextended position.

A solid shaft 84 extends through the drive wheel 61 and is secured thereto. The drive shaft 84 extends between the bearing blocks 77 and 78. When piston head 66 is retracted, compressed air enters the chamber 65 from conduit 64, and the air travels through passageway 70, exits the base 71 of the pneumatic piston cylinder assembly, and enters the bottom of the pneumatic piston cylinders 73 and 74. As the air pressure builds up in the pneumatic piston cylinders 73 and 74, the air pressure acts against the piston heads 79 and 80, causing them to rise, thereby extending the piston rods and raising the bearing blocks 77 and 78. Since the drive wheel 61 is on the same solid drive shaft 84 as the bearing block, the drive wheel is also lifted.

When the piston rods 75 and 76 are unextended, the drive shaft 84 is spaced apart from the treaded surface of the central drive section 63 of the track defined by the inside surface 46 of the wheel 11. When the piston rods 75 and 76 are extended, thereby lifting the bearing blocks and the drive wheels, the tread 62 on the drive wheel 61 is brought into engagement with the central drive portion 63 of the wheel 11.

An additional assembly is provided in order to rotate the drive wheel 61 in either a forward or reverse direction to correspondingly rotate the wheel 11 and move the vehicle. Accordingly, solenoid 68b can be actuated for the purpose of moving the vehicle in the forward direction, and solenoid 68c can be actuated for moving the vehicle in the backwards or reverse direction. Solenoids 68b and 68c can be actuated by the vehicle operator by utilizing means (not shown) for sending an appropriate electrical signal through the solenoid control wires-in-harness 69 to the desired solenoid.

The valve piston chamber 65 includes a third opening that is covered by piston head 66b when the piston head is in the extended, raised position, thereby preventing air from exiting the chamber 65 through the third opening. A conduit 85 has one end secured to the third opening in the wall of chamber 65, and an opposite end connected to the forward direction air motor 86. The conduit 85 is in communication with both the chamber 65 and the air motor 86. A flexible, rotatable drive shaft 87 extends through the air motor and has one end secured to the rigid drive shaft 84, preferably within the bearing block 77. Within the air motor 86, the flexible drive shaft 87 has a plurality of fan blades 88 (FIG. 2) secured thereto.

The drive wheel 61, in contact with the tread in the recessed portion 63 of the inside surface 46 of the wheel 11, turns the wheel 11 in the selected direction. The selected direction is determined by electrical dashboard controls (not shown) connected through the solenoid wires-in-harness 69.

If it is desired to move the vehicle forward, solenoid 68b is activated as soon as possible following the engagement of the drive wheel 61 with the central drive portion 63 of the wheel. It is noted that solenoid 68a has already been activated, so that piston head 66a is retracted to enable air to enter the chamber 65 from the conduit 64. The actuation of solenoid 68a causes the retraction of piston head 66a, which moves from the extended position downward to an unextended, retracted position. When piston head 66b is retracted, the third opening in the wall of the chamber 65 is exposed, so that air exits from the chamber 65 and goes into conduit 85. The air flows through conduit 85 and enters the air motor 86, whereupon the air travels through the air motor 86 and acts upon the fan blades 88, causing the fan blades to move and the flexible drive shaft 87 to rotate in what is considered the forward direction. This causes a corresponding rotation of the drive shaft 84 and the drive wheel 61, thereby rotating the wheel 11 in the same direction so that the vehicle will move forward.

As a cruising speed for the vehicle is attained, the vehicle operator can release the accelerator pedal (not shown). This terminates the electrical signal to the solenoid 68a, thereby causing the piston head 66a to rise to the extended position which blocks the flow of air into the chamber 65 from the conduit 64. As a result, the air pressure on the pneumatic cylinder piston heads 79 and 80 is reduced, causing the piston rods 75 and 76 to retract to the unextended position by means of the compression springs 81 and 82 urging the piston heads 79 and 80 downward until the compression springs resume their normally uncompressed position. This results in the retraction of the bearing blocks 77 and 80, which correspondingly retracts the drive wheel 61 so that it is no longer in engagement with the central drive portion 63 of the wheel. When air is no longer being admitted into the chamber 65, neither of the air motors 86 or 91 are in operation.

A similar arrangement is provided to enable the drive wheel 61 to move in the opposite direction so that the vehicle will move backwards, when desired.

The valve piston chamber 65 includes a fourth opening that is covered by piston head 66c when the piston head is in the extended, raised position, thereby preventing air from exiting the chamber 65 through the fourth opening. A conduit 90 has one end secured to the fourth opening in the wall of chamber 65, and an opposite end connected to the reverse direction air motor 91. The conduit 90 is in communication with both the chamber 65 and the air motor 91. A flexible, rotatable drive shaft 92 extends through the air motor and has one end secured to the rigid drive shaft 84, preferably within the bearing block 78. Within the air motor 91, the flexible drive shaft 92 has a plurality of fan blades 93 (FIG. 2) secured thereto.

If it is desired to move the vehicle backwards, solenoid 68c is activated as soon as possible following the engagement of the drive wheel 61 with the central drive portion 63 of the wheel. It is noted that solenoid 68a has already been activated, so that piston head 66a is retracted to enable air to enter the chamber 65 from the conduit 64. The actuation of solenoid 68c causes the retraction of piston head 66c, which moves from the extended position downward to an unextended, retracted position.

When piston head 66c is retracted, the fourth opening in the wall of the chamber 65 is exposed, so that air exits from the chamber 65 and goes into conduit 90. The air flows through conduit 90 and enters the air motor 91, whereupon the air travels through the air motor 91 and acts upon the fan blades 93, causing the fan blades to move and the flexible drive shaft 92 to rotate in what is considered the reverse direction. This causes a corresponding rotation of the drive shaft 84 and the drive wheel 61, thereby rotating the wheel 11 in the same direction so that the vehicle will move backwards.

The forward or reverse momentum of the vehicle that is achieved by means of the drive wheel 61 is perpetuated by the lift effect created between the bottom surface 49 of the chamber 48 and the inside surface 46 of the wheel.

Referring to FIG. 2, a frame or housing 95 contains portions of the pneumatic drive assembly 60, including the drive wheel 61, air motors 86 and 91, bearing blocks 77 and 78, and shafts 84, 87 and 92. The housing 95 is supported by braces 96 that have one end secured to the housing 95 and an opposite end that is operably connected to, and supported by, the vehicle frame. As a result, the pneumatic drive assembly 60 is maintained in its generally upright position.

A plurality of rollers 97 are rotatable about pins 98 that extend through the rollers. The pins 98 are rotatably received in brackets 99 that are mounted on the housing 95. The rollers 97 have a smooth outer surface that are always maintained in engagement with the inside surface 46 of the wheel 11 on opposite sides of the recessed central portion 63. The rollers 97 maintain a predetermined desired spacing between the bottom surface of the chamber 49 and the inside surface 46 of the wheel 11. The rollers 97 also maintain a predetermined desired spacing between the retracted drive wheel 62 and the tread on the recessed central portion 63 on the inside surface of the wheel 11.

Apparatus For Braking a Moving Vehicle

In accordance with the present invention, an apparatus 100 is provided for braking a moving vehicle. Referring to FIG. 1, the apparatus 100 includes a plurality of bellows 102 secured to a ring 104 that is mounted to the frame 106 of the wheel 11. The bellows wheel or ring 104 is similar to the ring 15 and bellows 20, but is a smaller version that is mounted vertically on wheel 11, and preferably is provided for each of the vehicle wheels 11 although the apparatus 100 is described in detail for only one of the wheels.

Since the ring 104 is secured to the wheel frame 106, the ring is driven by the wheel frame 106 at the rate of rotation of the wheel 11.

Each of the individual bellows 102 is adapted to receive air and is movable between an inflated, expanded condition and a substantially deflated, compressed condition. Each of the bellows is inherently biased to the expanded, inflated condition.

The bellows 102 are sequentially spaced about the ring 104, and all of the bellows preferably are of substantially identical construction.

Each of the bellows includes valve means for permitting air to enter the bellows when moved from the substantially deflated condition to the inflated condition, and for permitting air to exit the bellows when moving from the inflated condition to the substantially deflated condition.

The valve means preferably comprises a first one-way valve 108 on the front wall of the bellows that permits air from the atmosphere to enter the bellows 102 and substantially prevents air in the bellows from exiting therefrom. The valve means further includes a second one-way valve 110 shown on the back wall of the bellows 102 that permits air to exit from the bellows 102 and substantially prevents air that is outside the bellows 102 from entering the bellows.

A depressor plate 112 is provided for mechanically moving the bellows 102 from the inflated, expanded condition to the substantially deflated, compressed condition. The depressor plate 112 is supported by and operably connected to the vehicle frame 12. The depressor plate is positioned directly in front of the ring 104 and is spaced apart from the ring by a distance about equal to the thickness of the bellows 102 in the compressed condition.

As the bellows 102 rotate on the ring 104, each of the bellows contacts the upwardly curved front end of the depressor plate 112, the front end preferably being curved outwardly. The outer wall of the bellows is depressed by means of the camming action resulting from the contact with the depressor plate. The bellows is thereby moved from the inflated, expanded condition to the deflated, compressed condition. As the bellows continues to rotate, it is released by the depressor plate, whereupon the bellows expands in accordance with its natural bias to assume the inflated condition. As the bellows inflates, air from the atmosphere enters the bellows through valve 108.

A plurality of air lines or conduits are used to convey the air from the bellows 102 to storage tanks 31 and 32. Referring to FIG. 1, as the outer wall of each bellows is pushed downward by the depressor plate 112, the bellows is compressed and air is forced out of the bellows through the one-way valve 110 and goes into bellows conduit 114 that has one end secured to the valve 110 and an opposite end that is secured to ring conduit 116 (see front right wheel in FIG. 1).

The bellows conduit 114 is in communication with the ring conduit 116. Each of the bellows 102 has a short bellows conduit 114 that extends to the ring conduit 116, with the conduit 116 circumscribing the entire ring 104 and positioned adjacent to the ring. Thus, as each of the bellows is compressed, the air is directed into the conduit 116.

Ring conduit 116 communicates with commutator conduit 118 which is an air line that extends from the conduit 116 to commutator 120. Conduits 114, 116 and 118 all rotate with ring 104 and wheel 11. The purpose of the commutator 120 is to convey the air that is collected from the depressed bellows from the rotating conduits to stationary conduits that are supported by the vehicle frame 12. Although the outer portion of the commutator rotates, it includes an inner portion that is stationary and forms a substantially airtight seal with the outer portion to prevent the escape of air.

The air from the inner portion of the commutator 120 is conveyed to the air conduit 122 and hence to air conduit 124. One end of air conduit 124 is secured to conduit 122, and the other end is secured to, and in communication with, the braking or exhaust valve 36.

The action of the braking valve 36 is controlled electrically by the use of the braking and accelerator pedals (not shown). When it is desired to slow or stop the moving vehicle, the driver depresses the brake pedal (not shown), thereby closing the braking valve 36. This prevents air from being vented to the atmosphere. As a result, the air pressure in the storage tanks 31 and 32 increases, and the air in the conduits 122 and 124 increases as well. This creates back pressure in the bellows 102, making it more difficult for the bellows to be compressed by the depressor plate 112. The resulting resistance of the bellows 102 to compression by the depressor plate 112 has a braking effect on the wheels 11, since a force is created that tends to resist the rotation of the wheels 11.

When the vehicle is stored idle, there is compressed air in the storage tanks 31 and 32 that remains after the vehicle has been used. An electrical control (not shown) is provided for the driver to indicate that the vehicle will be stored idle. When the electrical control is actuated, a control valve 130 is opened so that air from tank 31 can travel through air line 132 to an air motor 134. The air travels through the air motor 134 and turns a shaft 135 that also extends through a generator 136. The air motor 134 is secured to the generator 136. The generator 136 converts the energy from the compressed air which rotates the shaft 135 to electrical energy. The electrical energy is transmitted to the battery 17 through cables 138.

If the air pressure in the storage tanks 31 and 32 becomes excessive during use of the vehicle, the overage would be released through the valve 130 for conversion to electricity by the generator 136 for recharging the battery 17.

A conventional disc braking system may be used in addition to the braking apparatus 100 to slow or stop the vehicle.

The bellows 102, in addition to the bellows 20, may be formed of flexible and durable materials such as elastomers.

In accordance with the various features of the present invention, it will be seen that compressed air is used for powering a moving vehicle such as an automobile, for minimizing friction in the wheel bearings so as to maintain the vehicle's momentum and decrease the amount of energy required for maintaining the vehicle at a predetermined desired speed, and for braking the vehicle. The present invention can be used instead of a conventional internal combustion engine, or as an auxiliary means for decreasing the amount of energy that is consumed by an internal combustion engine to increase the speed of a vehicle and maintain a vehicle at a predetermined speed.

From the foregoing, it will be observed that numerous variations and modifications may be effected without departing from the true spirit and scope of this invention. It is to be understood that no limitation with respect to the specific apparatus illustrated and described herein is intended or should be inferred. It is, of course, intended to cover by the appended claims all such modifications as fall within the scope of the claims.

I claim:

1. A pneumatic drive assembly in which a drive wheel is adapted to engage a track, comprising:
    a frame,
    a drive wheel mounted to a drive shaft, said drive shaft being supported by said frame and movable relative to said frame,
    an enclosed chamber supported by said frame, said chamber defining first and second openings,
    a conduit communicating with said first opening in said chamber for providing air to said chamber,
    means for regulating the entry of air into said chamber, whereby an operator can have air admitted into said chamber or substantially prevent air from entering said chamber,
    a second conduit having one end in communication with said second opening in said chamber,
    pneumatic cylinder means in communication with the other end of said second conduit, said pneumatic cylinder being supported by said frame and movable between an unextended position and an extended position,
    means for operably connecting said pneumatic cylinder means to said drive shaft,
    whereby when air is admitted into said chamber, said air exits said chamber into said second conduit, moves said pneumatic cylinder means from said unextended position to said extended position, and thereby moves said drive shaft and drive wheel from a first position in which said drive wheel is spaced apart from said track to a second position in which said drive wheel engages said track.

2. A pneumatic drive assembly as set forth in claim 1 wherein:
    said chamber also defines a third opening,
    a third conduit having one end in communication with said third opening in said chamber,
    first air motor means supported by said frame and in communication with the other end of said third conduit, said first air motor means including first rotatable means operably connected to said drive shaft,
    means for regulating the entry of air into said third conduit,
    whereby when air is admitted into said third conduit, said air actuates said first air motor which thereby turns said first rotatable means and said drive shaft and rotates said drive wheel.

3. A pneumatic drive assembly as set forth in claim 2 wherein:
    said chamber also defines a fourth opening,
    a fourth conduit has one end in communication with said fourth opening in said chamber,
    second air motor means supported by said frame and in communication with the other end of said fourth conduit, said second air motor means including second rotatable means operably connected to said drive shaft,
    means for regulating the entry of air into said fourth conduit,
    whereby when air is admitted into said third conduit, said air actuates said first air motor means which thereby turns said first rotatable means and said drive shaft and rotates said drive wheel in a first direction, and when air is admitted into said fourth conduit, said air actuates said second air motor means which thereby turns said second rotatable means and said drive shaft and rotates said drive wheel in an opposite second direction.

4. A pneumatic drive assembly as set forth in claim 1 wherein said means for regulating the entry of air into said chamber comprises piston means that is supported by said frame and is retractable and extendable between a first position in which said piston means substantially covers said first opening to substantially prevent the entry of air into said chamber, and a second position in which said piston means is spaced apart from said first opening so that air can be admitted into said chamber, and further including means for actuating said piston means.

5. A pneumatic drive assembly as set forth in claim 2 wherein said means for regulating the entry of air into said chamber comprises first piston means that is supported by said frame and is retractable and extendable between a first position in which said first piston means substantially covers said first opening to substantially prevent the entry of air into said chamber, and a second position in which said first piston means is spaced apart from said first opening so that air can be admitted into said chamber,
    and wherein said means for regulating the entry of air into said third conduit comprises second piston means that is supported by said frame and is retractable and extendable between a first position in which said second piston means substantially covers said third opening to substantially prevent the entry of air into said third conduit, and a second position in which said second piston means is spaced apart from said third opening so that air can be admitted into said third conduit, and further including means for actuating said first and second piston means.

6. A pneumatic drive assembly as set forth in claim 1 wherein said pneumatic cylinder means comprises at least one cylinder having a piston rod extending at least partially out of said cylinder, said piston rod having a piston head at one end thereof positioned within said cylinder, resilient means within said cylinder positioned between said piston head and one end of said cylinder to resist movement of said piston rod from one of said unextended and extended positions to the other of said positions and to return said piston rod to said one position when air is not admitted into said chamber.

7. A pneumatic drive assembly as set forth in claim 6 wherein said means for operably connecting said pneumatic cylinder means to said drive shaft comprises a bearing block secured to said piston rod, said drive shaft being received through said bearing block.

8. A pneumatic drive assembly as set forth in claim 6 wherein said means for operably connecting said pneumatic cylinder means to said drive shaft comprises a pair of spaced apart bearing blocks operably connected to said pneumatic cylinder means, each of said blocks being spaced apart from said drive wheel, said drive wheel having an axis through which said drive shaft extends, said bearing blocks being positioned on opposite sides of said drive wheel, said drive shaft being received through each of said bearing blocks.

9. A pneumatic drive assembly as set forth in claim 5 wherein said pneumatic cylinder means comprises at least one cylinder having a piston rod partially in said cylinder and partially extending out of said cylinder, said piston rod having a piston head at one end thereof, resilient means within said cylinder positioned between said piston head and one end of said cylinder to resist movement of said piston rod from one of said unextended and extended positions to the other of said positions and to return said piston rod to said one position when air is not admitted into said chamber, and said means for operably connecting said pneumatic cylinder means to said drive shaft comprises a pair of spaced apart bearing blocks operably connected to said pneumatic cylinder means, each of said bearing blocks being spaced apart from said drive wheel, said drive wheel having an axis through which said drive shaft extends, said bearing blocks being positioned on opposite sides of said drive wheel, said drive shaft being received through each of said bearing blocks.

10. A pneumatic drive assembly, comprising:
a frame,
a drive shaft supported by said frame,
a drive wheel mounted on said drive shaft,
an enclosed chamber supported by said frame and defining first, second and third openings,
a first conduit communicating with said first opening in said chamber,
means for providing air to said first conduit,
means for regulating the entry of air into said chamber through said first conduit,
a second conduit having one end in communication with said second opening in said chamber,
a third conduit having one end in communication with said third opening in said chamber,
first air motor means in communication with the other end of said second conduit, said first air motor means including first rotatable means operably connected to said drive shaft and adapted to rotate said drive shaft in a first direction,
second air motor means in communication with the other end of said third conduit, said second air motor means including second rotatable means operably connected to said drive shaft and adapted to rotate said drive shaft in an opposite second direction,
means for regulating the entry of air into said second conduit, and
means for regulating the entry of air into said third conduit,
whereby an operator can admit air into said chamber and admit air into said second conduit, said air actuating said first air motor means which thereby turns said first rotatable means and said drive shaft and rotates said drive wheel in a first direction, and can admit air into said third conduit for rotating said drive shaft and said drive wheel in an opposite second direction.

11. A pneumatic assembly as set forth in claim 10 wherein said means for regulating the entry of air into said chamber comprises piston means that is retractable and expandable between a first position in which said piston means substantially covers said first opening to substantially prevent the entry of air into said chamber, and a second position in which said piston means is spaced apart from said first opening so that air can be admitted into said chamber, and further including means for actuating said piston means.

12. A pneumatic assembly as set forth in claim 10 wherein said means for regulating the entry of air into said chamber comprises first piston means that is retractable and extendable between a first position in which said first piston means substantially covers said first opening to substantially prevent the entry of air into said chamber, and a second position in which said first piston means is spaced apart from said first opening so that air can be admitted into said chamber, and wherein said means for regulating the entry of air into said second and third conduits comprises second and third piston means, said second and third piston means each being retractable and extendable between a first position in which said piston means substantially covers one of said openings to substantially prevent the entry of air into said conduit that communicates with said opening, and a second position in which said piston means is spaced apart from said one opening so that air can be admitted into said conduit that communicates with said opening, and further including means for actuating said first, second and third piston means.

* * * * *